J. W. MELVIN.
SCREW-TAP.

No. 184,097. Patented Nov. 7, 1876.

WITNESSES:

INVENTOR:

UNITED STATES PATENT OFFICE.

JOSIAH W. MELVIN, OF HOUSTON, TEXAS.

IMPROVEMENT IN SCREW-TAPS.

Specification forming part of Letters Patent No. 184,097, dated November 7, 1876; application filed September 22, 1876.

*To all whom it may concern:*

Figure 1:
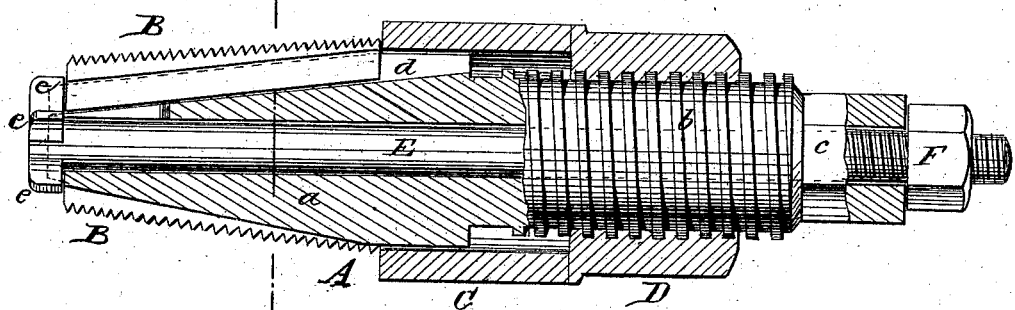
Figure 2:
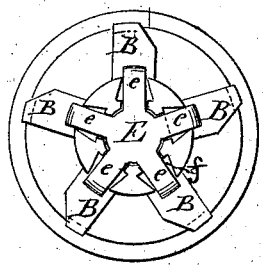
Figure 3:
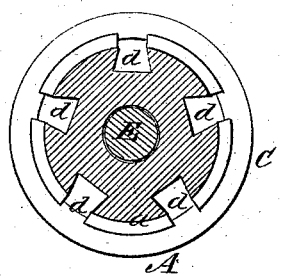
Figure 4:
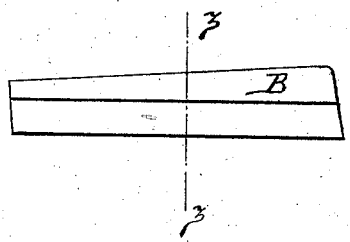
Figure 5:

Be it known that I, JOSIAH W. MELVIN, of Houston, in the county of Harris and State of Texas, have invented a new and Improved Combined Expanding Tap and Reamer, of which the following is a specification:

In the accompanying drawing, Figure 1 is a longitudinal section on line $x\ x$ in Fig. 2. Fig. 2 is an end view. Fig. 3 is a transverse section on line $y\ y$ in Fig. 1. Fig. 4 is a detail view of a cutter for a reamer. Fig. 5 is a transverse section on line $z\ z$ in Fig. 4.

Similar letters of reference indicate corresponding parts.

My invention relates to expanding taps and reamers; and it consists in the arrangement in dovetailed grooves in a tapering mandrel or holder of thread-cutters for sections of a tap, or plain cutters for a reamer, the same being forced against a thimble that is backed by a nut working on a thread on a straight portion of the mandrel by a bolt that passes through the center of the mandrel, and is provided with nibs that work in slots at the small end of the mandrel, and bear against the ends of the cutters. The other end of the bolt is provided with a nut, which, being turned, draws the cutters against the thimble.

The object of my invention is to provide a tool that shall combine the features of an expanding tap and reamer for reaming and tapping holes of different sizes.

Referring to the drawing, A is a mandrel or holder, which is made tapering at $a$, and is provided with a thread, $b$, on its straight portion, and is squared at $c$ to receive a tap-wrench. The part $a$ is slotted throughout its length with a number of dovetailed slots, $d$, that run parallel with the outer surface. B B, &c., are cutters, which may be made for cutting a screw-thread, as shown in Fig. 1, or plain, for reaming, as shown in Fig. 4. These cutters are capable of sliding longitudinally in the slots $d$. C is a thimble placed on the threaded portion $b$, against which the ends of cutters B rest. D is a nut which engages the thread $b$, and regulates the size of the tap or reamer by limiting the distance through which the cutters are moved in the diverging slots of the tapering portion of the mandrel. The mandrel is bored through its center, and is provided with a bolt, E, having nibs $e$, that slide in slots $f$, cut through the metal that separates the slots $d$ and the central bolt-hole. These nibs press against the lower ends of the cutters B as the bolt is drawn through the mandrel by the nut F.

To expand the tap or reamer the nut F is first loosened, when the nut D may be readily turned back as far as it is desired to move the cutters. This nut F is then turned, drawing the cutters B toward the thimble C, causing them to take a position on the larger part of the mandrel, and clamping them between the nibs $e$ and thimble C.

It is obvious that to diminish the size of the tap or reamer the operation just described is reversed.

When a tap or reamer is made so long that it is impracticable or inconvenient to bore it throughout its entire length for the bolt E, it is bored only a short distance above the cutting part where the shank is slotted, and a gib is placed in a mortise in the bolt which projects through the slot in the shank. A nut answering the same purpose as the nut F is placed on a thread on its shank and bears against the gib.

Having thus described my invention, what I claim as new, and desire to secure by Letters Patent, is—

1. An expanding tap or reamer, having cutters placed in slots in the tapering portion of a mandrel, in which they are capable of being moved longitudinally and clamped by a thimble and nut upon the outer side of the mandrel and a clamping-bolt running through the mandrel, substantially as shown and described.

2. The combination of the mandrel A, having slots $d$, thimble C, nut D, cutters B, bolt E, nibs $e$, and nut F, substantially as shown and described.

JOSIAH WALTER MELVIN.

Witnesses:
JULES ALBERT,
WM. ANDERSON.